US010394961B2

United States Patent
Zu et al.

(12) United States Patent
(10) Patent No.: US 10,394,961 B2
(45) Date of Patent: Aug. 27, 2019

(54) FOREIGN LANGUAGE SENTENCE CREATION SUPPORT APPARATUS, METHOD, AND PROGRAM

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Guowei Zu, Tokyo (JP); Toshiyuki Kano, Kanagawa (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 0 days.

(21) Appl. No.: 14/927,720

(22) Filed: Oct. 30, 2015

(65) Prior Publication Data

US 2016/0124943 A1 May 5, 2016

(30) Foreign Application Priority Data

Nov. 4, 2014 (JP) ................................ 2014-224518

(51) Int. Cl.
*G06F 17/27* (2006.01)
*G06F 17/28* (2006.01)

(52) U.S. Cl.
CPC ........ *G06F 17/2827* (2013.01); *G06F 17/271* (2013.01); *G06F 17/2755* (2013.01); *G06F 17/2785* (2013.01); *G06F 17/2836* (2013.01)

(58) Field of Classification Search
CPC ............... G06F 17/2827; G06F 17/271; G06F 17/2836; G06F 17/2785; G06F 17/2755
See application file for complete search history.

(56) References Cited

U.S. PATENT DOCUMENTS 5,477,451 A * 12/1995 Brown ................ G06F 17/2755 704/2
5,677,835 A * 10/1997 Carbonell ............... G06F 17/21 704/8

(Continued)

FOREIGN PATENT DOCUMENTS

CN 101295298 10/2008
CN 102654866 9/2012

(Continued)

OTHER PUBLICATIONS

Taiwanese Office Action for Taiwanese Patent Application No. 104134199 dated Oct. 26, 2016.

(Continued)

*Primary Examiner* — Fariba Sirjani
(74) *Attorney, Agent, or Firm* — Amin, Turocy & Watson LLP

(57) ABSTRACT

According to one embodiment, an input unit accepts input of an input sentence that is a second sentence of the native language corresponding to a first sentence. A language analysis execution unit executes language analysis for the input sentence. A grammatical feature extraction unit extracts a grammatical feature of the input sentence based on a result of the executed language analysis. A search query generation unit generates a search query based on the extracted grammatical feature. An output unit searches for an index based on the generated search query and outputs an exemplary sentence set including an exemplary sentence of the native language corresponding to an index that matches the search query and an exemplary sentence of the foreign language corresponding to the exemplary sentence of the native language.

13 Claims, 17 Drawing Sheets

[Characters are in Japanese.]

<Noun clause>—<Postpositional particle(は/が)>—<Noun clause>—
("ha"/"wo")
<Postpositional particle(を/が)>—<Verb>(増える/増やす)
("wo"/"ga") (increase(intransitive verb) / increase(transitive verb))

(56) References Cited

U.S. PATENT DOCUMENTS 6,092,034 A * 7/2000 McCarley .......... G06F 17/2795 704/2
6,182,026 B1 * 1/2001 Tillmann .......... G06F 17/2809 704/2
6,321,189 B1 * 11/2001 Masuichi .......... G06F 17/2755 704/7
6,393,389 B1 * 5/2002 Chanod .......... G06F 17/271 704/4
7,016,977 B1 3/2006 Dunsmoir et al.
7,058,567 B2 * 6/2006 Ait-Mokhtar .......... G06F 17/271 704/1
7,212,964 B1 5/2007 Alshawi et al.
7,239,998 B2 7/2007 Xun
7,389,220 B2 * 6/2008 Kharrat .......... G06F 17/271 704/1
7,437,669 B1 10/2008 Blakely et al.
7,493,602 B2 2/2009 Jaeger et al.
8,214,196 B2 * 7/2012 Yamada .......... G06F 17/2818 704/2
8,594,992 B2 * 11/2013 Kuhn .......... G06F 17/2827 704/2
9,152,622 B2 * 10/2015 Marcu .......... G06F 17/2827
9,367,541 B1 * 6/2016 Servan .......... G06F 17/278
2002/0010574 A1 * 1/2002 Tsourikov .......... G06F 17/271 704/9
2005/0102614 A1 * 5/2005 Brockett .......... G06F 17/2765 715/234
2006/0129381 A1 * 6/2006 Wakita .......... G06F 17/2872 704/9
2006/0217818 A1 * 9/2006 Fujiwara .......... G06N 5/04 700/16
2007/0094006 A1 * 4/2007 Todhunter .......... G06F 17/2785 704/8
2008/0262826 A1 * 10/2008 Pacull .......... G06F 17/2818 704/3
2008/0300862 A1 * 12/2008 Roux .......... G06F 17/271 704/9
2009/0063126 A1 3/2009 Itagaki et al.
2009/0119090 A1 * 5/2009 Niu .......... G06F 17/24 704/1
2009/0228263 A1 * 9/2009 Kamatani .......... G06F 17/2809 704/4
2009/0234634 A1 9/2009 Chen et al.
2009/0248671 A1 * 10/2009 Maruyama .......... G06F 17/30707
2010/0293447 A1 * 11/2010 Kadowaki .......... G06F 17/2755 715/201
2010/0306203 A1 * 12/2010 Rozok .......... G06F 17/28 707/741
2011/0093254 A1 * 4/2011 Kuhn .......... G06F 17/2827 704/2
2011/0295589 A1 * 12/2011 Brockett .......... G06F 17/2775 704/4
2011/0320468 A1 * 12/2011 Child .......... G06F 17/2223 707/756
2013/0006954 A1 * 1/2013 Nikoulina .......... G06F 17/2818 707/706
2013/0212123 A1 * 8/2013 Matveenko .......... G06F 17/2735 707/769
2013/0226556 A1 * 8/2013 Hwang .......... G06F 17/2818 704/2
2013/0304469 A1 * 11/2013 Kamada .......... G10L 15/02 704/239
2014/0067361 A1 * 3/2014 Nikoulina .......... G06F 17/2818 704/2
2014/0200878 A1 * 7/2014 Mylonakis .......... G06F 17/2854 704/4
2014/0207439 A1 * 7/2014 Venkatapathy .......... G06F 17/2836 704/4
2014/0337989 A1 * 11/2014 Orsini .......... H04L 51/12 726/26
2014/0358519 A1 * 12/2014 Mirkin .......... G06F 17/2854 704/3
2015/0025877 A1 * 1/2015 Ueno .......... G06F 3/0237 704/9
2015/0199339 A1 * 7/2015 Mirkin .......... G06F 17/289 704/2
2015/0248401 A1 * 9/2015 Ruvini .......... G06Q 30/0601 704/2
2015/0269839 A1 * 9/2015 Itaya .......... G06F 17/50 340/934
2015/0293910 A1 * 10/2015 Mathur .......... G06F 17/2818 704/2
2016/0055849 A1 * 2/2016 Watanabe .......... G10L 15/00 704/235
2016/0217122 A1 * 7/2016 Ji .......... G06F 17/27

FOREIGN PATENT DOCUMENTS

| | | |
|---|---|---|
| JP | 02-190972 | 7/1990 |
| JP | 6-110929 | 4/1994 |
| JP | 07-141382 | 6/1995 |
| JP | 10-105555 | 4/1998 |
| JP | 2000-259627 | 9/2000 |
| JP | 2003-006191 | 1/2003 |
| JP | 2003-228578 | 8/2003 |
| JP | 2004-133564 | 4/2004 |
| JP | 2008-233955 | 10/2008 |
| JP | 2014-109791 | 6/2014 |
| JP | 2014-142780 | 8/2014 |
| JP | 2007-317140 | 12/2017 |
| TW | I385538 | 2/2013 |
| TW | I427976 | 2/2014 |
| TW | I456414 | 10/2014 |
| TW | I457868 | 10/2014 |

OTHER PUBLICATIONS

Yamamoto, et al. “Example-based News Article Summarization by Imitating Summary Instances”, Department of Electrical Engineering, Nagaoka University of Technology, vol. 15, No. 3, Jul. 2008.
Hyodo, et al. “Similar Sentence Retrieval System over a Large Copus with Syntactic Structure”, Faculty of Engineering, Gifu University.

* cited by examiner

31a

[Characters are in Chinese.]

| Entry word | Part of speech | Grammatical attribute | Grammatical pattern | Synonym |
|---|---|---|---|---|
| 读 (read) | Verb | | | 阅读 (peruse) |
| 让 (let) | Function word | Causative | 让(let)—Verb | 叫 (let/order) |
| | | | | 令 (order/command) |
| | | | | 使 (make/cause) |
| 懂 (understand) | Verb | | | 理解 (comprehend) |
| | | | | 知道 (realize) |
| | | | | 掌握 (master) |
| ... | | | | |

F I G. 3

[Characters are in Japanese.]

31b

PP: postpositional particle

| Entry word | Part of speech | Grammatical attribute | Grammatical pattern | Synonym | Intransitive/ transitive verb pair |
|---|---|---|---|---|---|
| 増える (increase) | Verb | Intransitive verb | Noun—が—増える ("ga": PP) (increase) | 増加する (rise) | 増える (increase) |
| 増やす (increase) | Verb | Transitive verb | Noun—を—増やす ("wo": PP) (increase) | 引上げる (raise) | 増やす (increase) |
| ... | | | | | |

F I G. 4

32a

[Characters are in Chinese and Japanese as marked.]

PP: postpositional particle

| Chinese exemplary sentence | Chinese index | Japanese exemplary sentence | Japanese index | English translation |
|---|---|---|---|---|
| 让你的智能手机读你的喜怒哀乐。 | 让—Target word—读—Object<br>(let) (read) | あなたのスマートフォンにあなたの感情を読ませる。 | Noun clause—は—("ha": PP)<br>Noun clause—を—読む<br>("wo": PP) (read) | Let your smartphone read your feelings. |
| 叫孩子们读英语。 | 叫—Target word—读—Object<br>(let) (read) | 子供達に英語を読ませる。 | Noun—は—Noun—を—読む<br>("ha": PP) ("wo": PP) (read) | Let children read English. |
| 让学生们阅读这本书。 | 让—Target word—阅读—Object<br>(let) (peruse) | 学生さんにこの本を閲読してもらう。 | Noun—は—Noun clause—<br>("ha": PP)<br>を—閲読する<br>("wo": PP) (peruse) | Let students peruse this book. |
| 公司给社员的工资增加了。 | Subject—给—Target word—的—<br>(let) (for)<br>Object—增加(Past)<br>(increased) | 会社は社員の給料を増やした。 | Noun—は—Noun clause—<br>("ha": PP)<br>を—増やす<br>("wo": PP) (increase) | The company increased salary for employees. |
| 企业增加采用人数的理由。 | Subject—增加—Target word—<br>(increased)<br>的—Object<br>(for) | 企業が採用数を増やす理由。 | Noun—が—Noun—を—<br>("ga": PP) ("wo": PP)<br>増やす—Noun<br>(increase) | Reasons for company to increase the number of hires. |
| 最近客人增加了。 | Adverb of time—Object<br>—增加(Past)<br>(increased) | 最近はお客さんが増えた。 | Noun—は—Noun—<br>("ha": PP)<br>が—増える<br>("ga": PP) (increase) | The number of clients recently increased. |
| ... | | | | |

FIG. 5

[Characters are in Chinese as marked.]

Input sentence A

让不懂日语的人读日语教科书。
(Let the person who doesn't understand Japanese read Japanese text book.)

F I G. 7A

Language type: Chinese

让<Function word>/不懂<Verb>/日语的<Adjective>/人<Noun>/读 <Verb>/日语教科书<Noun>/。
(let) (doesn't understand) (Japanese) (person) (read) (Japanese textbook)

F I G. 7B

[Characters are in Chinese.]

[Characters are in Chinese.]

Grammatical feature
Language type: Chinese
Main verb: 读 (read)
Sentence pattern: Causative sentence
Function word: 让 (let)
Sentence composition: 让 (let) <Function word>—(不懂 (doesn't understand) <Negative verb>—日语 (Japanese) <Noun>—的<Function word>—人 (person) <Noun>)
<Target word>—读 (read) <Main verb>—日语教科书 (Japanese textbook) <Object>

FIG. 9

[Characters are in Chinese.]

让(叫/令/使) – <Target word> – 读(阅读) – <Object>
(let(order/command/make)) ( read(peruse) )

FIG. 10

[Characters are in OUTPUT SENTENCES are in Japanese
and lines below in parentheses are in Chinese.]

Output sentence A-1.あなたのスマートフォンにあなたの感情を読ませる。
(让你的智能手机读你的喜怒哀乐。)
(Let your smartphone read your feelings.)
Output sentence A-2.子供達に英語を読ませる。
(叫孩子们读英语。)
(Let children read English.)
Output sentence A-3.学生さんにこの本を閲読してもらう。
(让学生们阅读这本书。)
(Let students peruse this book.)

FIG. 11

[Characters are in Japanese as marked.]

Input sentence B

管理者はデータを増えた。
(The manager increased (intransitive verb) data.)

F I G. 12A

Language type: Japanese

管理者＜Noun＞/は＜Postpositional particle＞/データ＜Noun＞/を＜Postpositional particle＞/増えた＜Verb＞/。
(the manager) ("ha") (data) ("wo") (increased (intransitive verb))

F I G. 12B

[Characters are in Japanese.]

Grammatical feature
Language type: Japanese
Sentence pattern: Past tense
Main verb: 増える(increase (intransitive verb))
Function word: は、を(“ha”, “wo”)
Sentence composition: 管理者＜Noun＞－は＜Postpositional particle＞－データ＜Noun＞－を＜Postpositional particle＞－増える＜Verb＞
(manager) (“ha”) (data) (“wo”) (increase (intransitive verb))

F I G. 13

[Characters are in Japanese.]

＜Noun clause＞－＜Postpositional particle(は/が)＞－＜Noun clause＞－
(“ha”/”wo”)
＜Postpositional particle(を/が)＞－＜Verb＞(増える/増やす)
(“wo”/”ga”) (increase(intransitive verb) / increase(transitive verb))

F I G. 14

[Characters are in OUTPUT SENTENCES are in Japanese and the lines below in parentheses are in Chinese.]

Output sentence B-1.会社は社員の給料を増やした。
(公司给社员的工资增加了。)
(The company increased salary for employees.)
Output sentence B-2.企業が採用数を増やす理由。
(企业增加采用人数的理由。)
(Reasons for company to increase the number of hires.)
Output sentence B-3.最近はお客さんが増えた。
(最近客人增加了。)
(The number of clients recently increased.)

FIG. 15

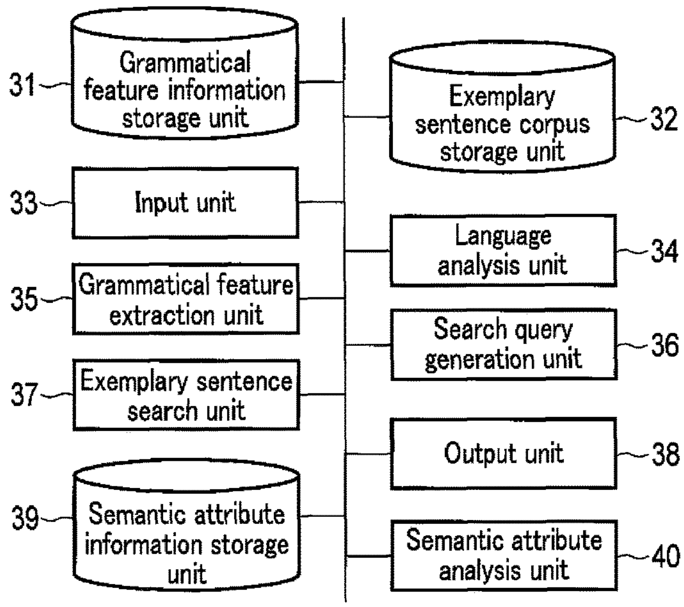

F I G. 16

[Characters are in Japanese.]

39a

| Entry word | Semantic attribute |
|---|---|
| リンゴ(apple) | Fruit |
| 月曜日(Monday) | Time |
| ... | |
| 管理者(manager) | Noun:Entity:Human |
| 子供子供(child) | Noun:Entity:Human |
| 最近(recently) | Noun:Abstract:Time |
| データ(data) | Noun:Concrete:Inanimate |
| 社長(president) | Noun:Entity:Human |
| 会社(company) | Noun:Entity:Organization |
| 社員(employee) | Noun:Entity:Human |
| 給料(salary) | Noun:Concrete:Inanimate |
| 採用数(the number of hires) | Noun:Concrete:Inanimate |
| 顧客(customer) | Noun:Entity:Human |
| お客さん(client) | Noun:Entity:Human |

F I G. 17

32b

[Characters are in Chinese and Japanese as marked.]

PP: postpositional particle

| Chinese exemplary sentence | Chinese index | Japanese exemplary sentence | Japanese index | English translation |
|---|---|---|---|---|
| 让你的智能手机读你的喜怒哀乐。 | 让(let)—Target word—读(read)—Object | あなたのスマートフォンにあなたの感情を読ませる。 | <Noun:Concrete:Inanimate>—に("ni":PP)—<Noun:Abstract:Feeling>—を("wo": PP)—読む(read) | Let your smartphone read your feelings. |
| 叫孩子们读英语。 | 叫(let)—Target word—读(read)—Object | 子供達に英語を読ませる。 | <Noun:Entity:Human>—は("ha": PP)—<Noun:Abstract:Human activity>—を("wo": PP)—読む(read) | Let children read English. |
| 让学生们阅读这本书。 | 让(let)—Target word—阅读(peruse)—Object | 学生さんにこの本を閲読してもらう。 | <Noun:Entity:Human>—は("ha": PP)—<Noun:Concrete:Inanimate>—を("wo": PP)—閲読する(peruse) | Let students peruse this book. |
| 公司给社员的工资增加了。 | Subject—给(let)—Target word—的(for)—Object—增加(Past)(increased) | 会社は社員の給料を増やした。 | <Noun:Entity:Human>—は("ha": PP)—<Noun:Concrete:Inanimate>—を("wo": PP)—増やす(increase) | The company increased salary for employees. |
| 企业增加采用人数的理由。 | Subject—增加(increase)—Target word—的(for)—Object | 企業が採用数を増やす理由。 | <Noun:Entity:Organization>—が("ga": PP)—<Noun:Concrete:Inanimate>—を("wo": PP)—増やす(increase)—<Noun:Abstract:Feeling> | The reasons for company to increase the number of hires. |
| 最近客人增加了。 | Adverb of time—Object—增加(Past)(increased) | 最近はお客さんが増えた。 | <Noun:Abstract:Time>—は("ha": PP)—<Noun:Entity:Human>—が("ga": PP)—増える(increase) | The number of clients recently increased. |
| … | | | | |

F I G. 18

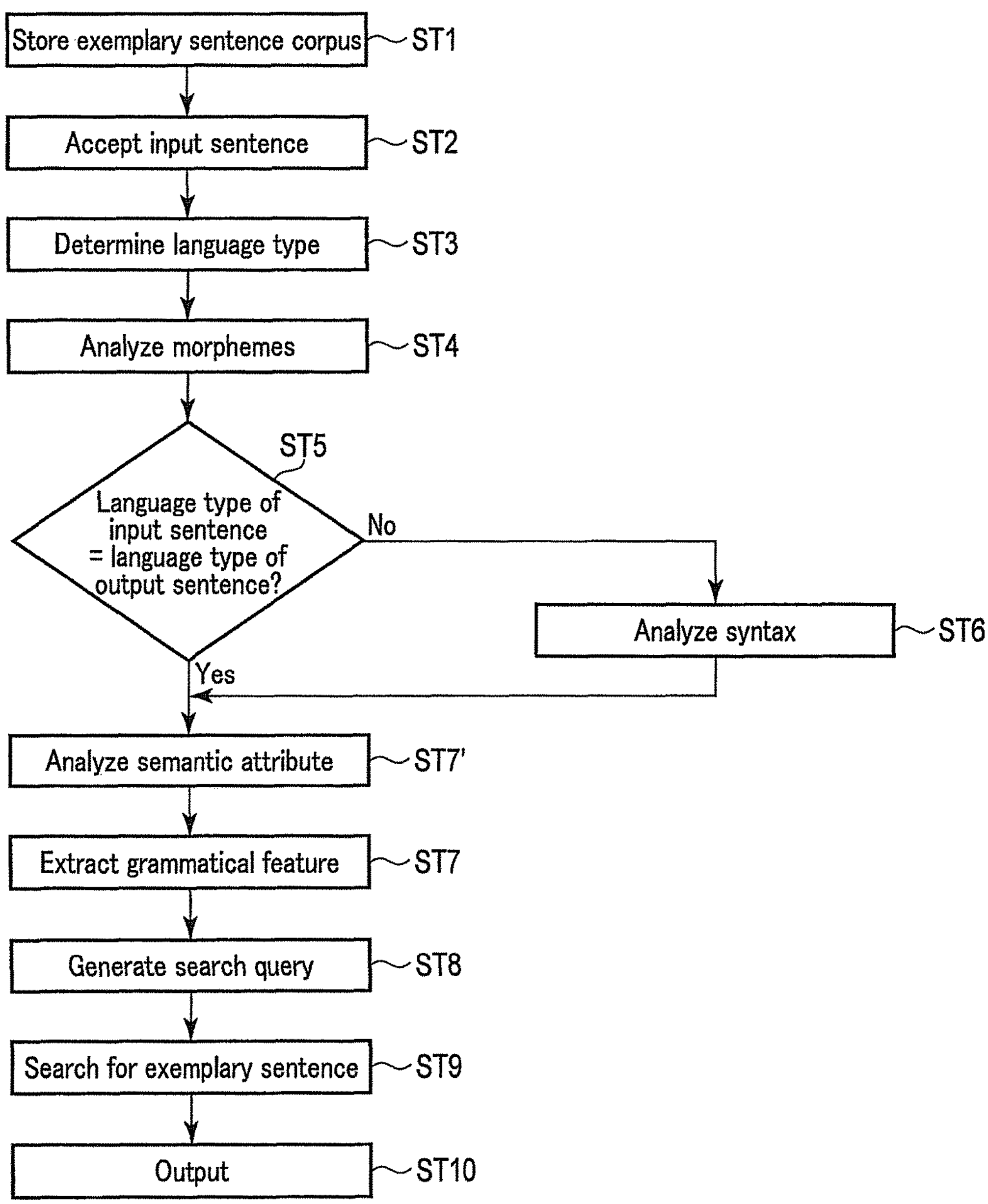
F I G. 19

[Characters are in Japanese as marked.]

Input sentence B

管理者はデータを増えた。
(The manager increased (intransitive verb) data.)

FIG. 20A

Language type: Japanese

管理者(Noun:Entity:Human)ーは<Postpositional particle>ーデータ(Noun:Concrete:Inanimate)
(The manager) (“ha”) (data)
ーを<Postpositional particle>ー増えた<Verb>。
(“wo) (increased (intransitive verb))

FIG. 20B

[Characters are in Japanese as marked.]

Grammatical feature
Language type: Japanese
Sentence pattern: Past tense
Main verb: 増える(increase (intransitive verb))
Function word: は、を (“ha”, “wo”)
Sentence composition: 管理者(Noun: Entity: Human)ーは<Postpositional particle>ーデータ(Noun: Concrete: Inanimate)
(manager) (“ha”) (data)
ーを<Postpositional particle>ー増える<Verb>
(“wo”) (increase (intransitive verb))

F I G. 21

[Characters are in Japanese.]

<Noun: Entity>ー<Postpositional particle(は/が)>ー<Noun: Concrete>ー
(“ha”/ “ga”)
<Postpositional particle(を/が)>ー<Verb>(増える/増やす)
(“wo”/ “ga”) (increase (intransitive verb) / increase (transitive verb))

F I G. 22

[Characters are in Japanese.]

<Noun:Entity:Human>－<Postpositional particle(は/が)>－<Noun:Concrete:Inanimate>－
("ha"/ "ga")
<Postpositional particle(を/が)> －<Verb>(増える/増やす)
("wo" / "ga") (increase (intransitive) / increase (transitive))

F I G. 23

[Characters are in OUTPUT SENTENCES are in Japanese and the lines below in parentheses are in Chinese.]

Output sentence B-1.会社は社員の給料を増やした。
(公司给社员的工资增加了。)
(The company increased salary for employee.)
Output sentence B-2.企業が採用数を増やす理由。
(企业增加采用人数的理由。)
(Reasons for company to increase the number of hires.)

F I G. 24

FOREIGN LANGUAGE SENTENCE CREATION SUPPORT APPARATUS, METHOD, AND PROGRAM

CROSS-REFERENCE TO RELATED APPLICATIONS

This application is based upon and claims the benefit of priority from Japanese Patent Application No. 2014-224518, filed on Nov. 4, 2014, the entire contents of which are incorporated herein by reference.

FIELD

Embodiments described herein relate generally to a foreign language sentence creation support apparatus, method, and program.

BACKGROUND

In a site of offshore development or the like, creation of sentences of a foreign language is often required. When a writer with only a limited knowledge of a foreign language grammar creates a foreign language sentence, there are roughly two situations. As the first situation, the writer creates a sentence of his/her native language, and then creates a desired foreign language sentence based on it. As the second situation, the writer creates a foreign language sentence that is grammatically imperfect, and then creates a desired foreign language sentence based on it. In both situations, to reduce a load on the writer and efficiently create the foreign language sentence, a method of supporting foreign language sentence creation is necessary.

As foreign language sentence creation support methods of this type, methods using, for example, machine translation, a wordbook, a parallel translation exemplary sentence database, and similarity are known.

In the method using machine translation, a foreign language sentence can be generated by translating a native language sentence input in the native language of the writer into a foreign language by machine translation.

In the method using a wordbook, if a foreign language word is unknown, a wordbook of the native language is searched, and an equivalent word is output, thereby obtaining the foreign language word.

In the method using a parallel translation exemplary sentence database, when a word of the native language is input, a parallel translation exemplary sentence database using a parallel translation dictionary and a similar word dictionary is searched, thereby outputting a corresponding equivalent word and an exemplary sentence including the equivalent word.

In the method using similarity, the words of an input sentence and those of an exemplary sentence to be searched for are compared, thereby outputting an exemplary sentence of high similarity.

However, all of these conventional foreign language sentence creation support methods put a heavy load on the writer.

For example, in the method using machine translation, since the machine translation result is not always a text intended by the writer, many correction operations are needed until the desired foreign language sentence is created.

In the method using a wordbook, it may be impossible to create a foreign language sentence from the obtained foreign language word, or the load of creating a foreign language sentence is heavy.

In the method using a parallel translation exemplary sentence database, exemplary sentences using unintended grammatical expressions are also searched for, and a load is needed to narrow down them into exemplary sentences using an intended grammatical expression. Additionally, the method using a parallel translation exemplary sentence database cannot be applied when inputting a foreign language sentence that is grammatically imperfect and creating a perfect foreign language sentence.

In the method using similarity, since exemplary sentences are searched by the similarity between words, unintended exemplary sentences may be included, and a load is incurred in narrowing them down into intended exemplary sentences.

That is, in the conventional foreign language sentence creation support methods, the load on the writer when creating an intended foreign language sentence is heavy.

It is an object of the present invention to provide a foreign language sentence creation support apparatus, method, and program capable of reducing the load when creating a foreign language sentence.

BRIEF DESCRIPTION OF THE DRAWINGS

FIG. 3 is a schematic view showing an example of grammatical feature information according to the embodiment;

FIG. 4 is a schematic view showing an example of grammatical feature information according to the embodiment;

FIG. 5 is a schematic view showing an example of an exemplary sentence corpus according to the embodiment;

FIG. 7A is a schematic view showing an example of an input sentence according to the embodiment;

FIG. 7B is a schematic view showing an example of a morphological analysis result according to the embodiment;

FIG. 9 is a schematic view showing an example of a grammatical feature according to the embodiment;

FIG. 10 is a schematic view showing an example of a search query according to the embodiment;

FIG. 11 is a schematic view showing an example of an output sentence according to the embodiment;

FIG. 12A is a schematic view showing an example of an input sentence according to the embodiment;

FIG. 12B is a schematic view showing an example of a morphological analysis result according to the embodiment;

FIG. 13 is a schematic view showing an example of a grammatical feature according to the embodiment;

FIG. 14 is a schematic view showing an example of a search query according to the embodiment;

FIG. 15 is a schematic view showing an example of an output sentence according to the embodiment;

FIG. 16 is a schematic view showing an example of the arrangement of a foreign language sentence creation support apparatus according to the second embodiment;

FIG. 17 is a schematic view showing an example of semantic attribute information according to the embodiment;

FIG. 18 is a schematic view showing an example of an exemplary sentence corpus according to the embodiment;

FIG. 19 is a flowchart for explaining an operation according to the embodiment;

FIG. 20A is a schematic view showing an example of an input sentence according to the embodiment;

FIG. 20B is a schematic view showing an example of a morphological analysis result according to the embodiment;

FIG. 21 is a schematic view showing an example of a grammatical feature according to the embodiment;

FIG. 22 is a schematic view showing an example of a search query according to the embodiment;

FIG. 23 is a schematic view showing an example of a search query according to the embodiment; and FIG. 24 is a schematic view showing an example of an output sentence according to the embodiment.

DETAILED DESCRIPTION

In general, according to one embodiment, a foreign language sentence creation support apparatus supports creation of a first sentence of a foreign language, which is a sentence formed from a plurality of clauses including at least an independent word.

The foreign language sentence creation support apparatus includes a storage unit, an input unit, a language analysis execution unit, a grammatical feature extraction unit, a search query generation unit, and an output unit.

The storage unit stores an exemplary sentence corpus that includes an exemplary sentence collection including an exemplary sentence set including an exemplary sentence of the foreign language and an exemplary sentence of a native language corresponding to the exemplary sentence of the foreign language, and an index corresponding to the exemplary sentence of the native language.

The input unit accepts input of an input sentence that is a second sentence of the native language corresponding to the first sentence.

The language analysis execution unit executes language analysis including morphological analysis and syntax analysis for the input sentence whose input has been accepted.

The grammatical feature extraction unit extracts a grammatical feature of the input sentence based on a result of the executed language analysis.

The search query generation unit generates a search query based on the extracted grammatical feature.

The output unit searches for the index based on the generated search query and outputs an exemplary sentence set including an exemplary sentence of the native language corresponding to an index that matches the search query and an exemplary sentence of the foreign language corresponding to the exemplary sentence of the native language.

Several embodiments will now be described with reference to the accompanying drawings. Note that a foreign language sentence creation support apparatus according to each embodiment can be implemented as a standalone user terminal or a server apparatus in a server-client system. The foreign language sentence creation support apparatus according to each embodiment may be implemented as each of a plurality of processing execution apparatuses selected in a low load state in a cloud computing system such as a private cloud or public cloud.

First Embodiment

Figure 1:
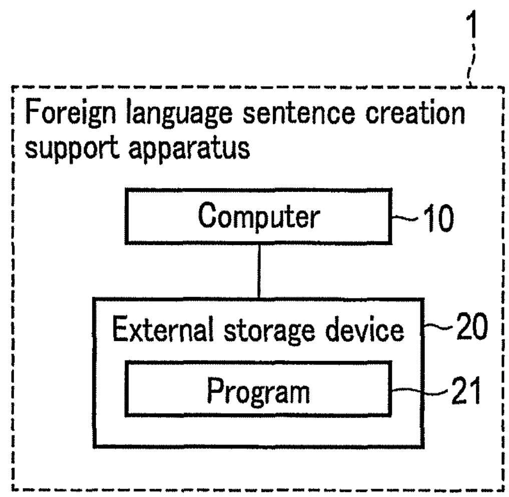
FIG. 1 is a block diagram showing the hardware arrangement of a foreign language sentence creation support apparatus according to the first embodiment.

FIG. 1 is a schematic view showing an example of the hardware arrangement of a foreign language sentence creation support apparatus according to the first embodiment. A foreign language sentence creation support apparatus 1 includes a computer 10 and an external storage device 20. The computer 10 is connected to the external storage device 20, for example, an HDD (Hard Disk Drive). The external storage device 20 stores a program 21 to be executed by the computer 10.

The foreign language sentence creation support apparatus 1 according to the first embodiment has a function of supporting creation of a first sentence of a foreign language, which is a sentence formed from a plurality of clauses including at least an independent word. The main user of the foreign language sentence creation support apparatus 1 according to each embodiment is assumed to be a person who does not have a composition capability of creating a grammatically perfect foreign language sentence without using an exemplary sentence but has a composition capability of creating a grammatically perfect foreign language sentence by selecting an appropriate an exemplary sentence. However, the foreign language sentence creation support apparatus 1 according to each embodiment can be applied not only to the main user but also to an arbitrary user who has a composition capability of creating an imperfect foreign language sentence.

Figure 2:
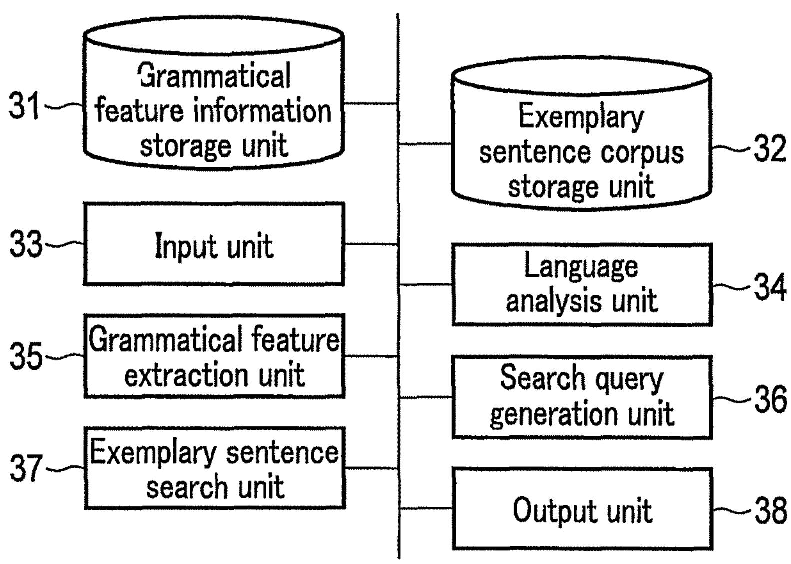
FIG. 2 is a block diagram showing an example of the arrangement of the foreign language sentence creation support apparatus according to the embodiment.

More specifically, as shown in FIG. 2, the foreign language sentence creation support apparatus 1 includes a grammatical feature information storage unit 31, an exemplary sentence corpus storage unit 32, an input unit 33, a language analysis unit 34, a grammatical feature extraction unit 35, a search query generation unit 36, an exemplary sentence search unit 37, and an output unit 38. The units 31 to 38 are implemented when the computer 10 executes the program 21 (foreign language sentence creation support program) stored in the external storage device 20. The program 21 can be distributed in a state in which the program 21 is stored in a computer-readable storage medium in advance. The program 21 may be downloaded to the computer 10 via, for example, a network. The grammatical feature information storage unit 31 and the exemplary sentence corpus storage unit 32 are implemented in, for example, the external storage device 20. However, they may be written in the memory (not shown) of the computer 10.

The grammatical feature information storage unit 31 is a readable/writable memory and stores, in advance, pieces of grammatical feature information 31*a* and 31*b* as shown in FIGS. 3 and 4 in which grammatical features including a part of speech, a grammatical attribute, a grammatical pattern, a synonym, and an intransitive/transitive verb pair are associated with an entry word. The grammatical feature information 31*a* is an example of grammatical feature information of Chinese, and the grammatical feature information 31*b* is an example of grammatical feature information of Japanese. Note that the grammatical feature information storage unit 31 may store not only the grammatical feature information of Chinese and Japanese but also grammatical feature information of an arbitrary language type. Additionally, in accordance with readout from the grammatical feature extraction unit 35 and the search query generation unit 36, the grammatical feature information storage unit 31 transmits the pieces of grammatical feature information 31*a* and 31*b* of a designated language type to the grammatical feature extraction unit 35 and the search query generation unit 36.

Here, "entry word" is the general term of words including a declinable word such as a verb or adjective and a function word such as a postpositional particle or auxiliary verb. A part of speech is information representing the part of speech of an entry word. A grammatical attribute is information representing a grammatical usage of an entry word. For example, if the part of speech of an entry word is verb, the grammatical attribute represents whether the word is an intransitive verb or a transitive verb. If the part of speech of an entry word is function word, the grammatical attribute represents a sentence pattern (for example, causative form, passive form, or conditional form) in which the function word is used. A grammatical pattern is information representing the format of a typical grammar when an entry word meets a grammatical application purpose. A synonym is information representing a word with a meaning that is the same as or similar to the meaning of an entry word. If the grammatical attribute of an entry word is an intransitive verb or transitive verb, an intransitive/transitive verb pair is information representing a transitive verb or intransitive verb paired with the verb of the entry word.

For example, as shown in FIG. 4, if the entry word is "増える", "verb" is stored as the part of speech, and "intransitive verb" is stored as the grammatical attribute. As the grammatical pattern, information "noun-が-増える" is stored as a typical usage of "増える". As the synonym, "増加 する" having a meaning similar to "増える" is stored. As the intransitive/transitive verb pair, "増やす" is stored as a transitive verb corresponding to "増える".

Note that each of the pieces of grammatical feature information 31*a* and 31*b* may include an item unique to the stored language type. For example, focus may be placed on Chinese and Japanese. In this case, the item of the intransitive/transitive verb pair included in the grammatical feature information 31*b* is an item unique to Japanese.

The exemplary sentence corpus storage unit 32 is a readable/writable memory and stores an exemplary sentence corpus 32*a* as shown in FIG. 5. The exemplary sentence corpus 32*a* includes an exemplary sentence collection including a Chinese exemplary sentence and a Japanese exemplary sentence corresponding to the exemplary sentence, and indices corresponding to the Chinese and Japanese exemplary sentences. The exemplary sentence corpus 32*a* may include an exemplary sentence collection including sets of parallel translation exemplary sentences corresponding to an arbitrary number of language types and indices corresponding to each of the language types of the exemplary sentence sets. As an index, for example, information representing the grammatical pattern of an exemplary sentence is usable. As the information representing the grammatical pattern of an exemplary sentence, for example, information that expresses the composition of the exemplary sentence by combining a target word of the exemplary sentence, postpositional particles of the exemplary sentence, and grammatical terms (for example, part of speech and grammatical role) of words other than the target word and postpositional particles of the exemplary sentence is usable.

As an index of this type, if the target word is a verb, for example, information obtained by replacing an indeclinable word included in the exemplary sentence with a part of speech based on the morphological analysis result of the exemplary sentence is usable. Giving a supplementary explanation, as the replaced information, information that describes the part of speech (for example, noun, noun clause, or pronoun) of the indeclinable word in place of the specific indeclinable word (for example, specific noun or pronoun) of the exemplary sentence is usable. Note that the information based on the morphological analysis result of the exemplary sentence may express a portion that can be put into a noun clause in the exemplary sentence as one noun clause.

Additionally, as an index, if the target word is a verb, for example, information obtained by replacing an indeclinable word included in the exemplary sentence with a grammatical role based on the syntax analysis result of the exemplary sentence is usable. Giving a supplementary explanation, as the replaced information, information that describes the grammatical role (for example, object or target word) of the indeclinable word in place of the specific indeclinable word (for example, specific noun or pronoun) of the exemplary sentence is usable. Note that the information based on the syntax analysis result of the exemplary sentence may express a portion that can be put into a noun clause in the exemplary sentence as one grammatical role.

In accordance with readout from the exemplary sentence search unit 37, the exemplary sentence corpus storage unit 32 transmits the exemplary sentence corpus 32*a* to the exemplary sentence search unit 37.

In accordance with a user operation on, for example, a keyboard or mouse (not shown), the input unit 33 accepts an instruction or sentence input from the user. For example, the input unit 33 has a function of accepting input of an input sentence that is a second sentence of a native language corresponding to a first sentence or input of an input sentence that is a third sentence of a foreign language. Note that the third sentence of the foreign language is, for example, an evaluation target sentence designated by the user. Note that the third sentence of the foreign language can be either a grammatically perfect sentence or a grammatically imperfect sentence. The input unit 33 also accepts input to designate the language type of a sentence (to be referred to as an output sentence hereinafter) to be output from the output unit 38 with respect to the input sentence whose input is accepted. The input unit 33 transmits the input sentence and the language type of the output sentence to the language analysis unit 34. In addition, the input unit 33 transmits the language type of the output sentence to the exemplary sentence search unit 37.

The input sentence is formed from a plurality of clauses including at least an independent word (for example, noun or verb). Note that the clauses that constitute the input sentence may include a dependent word (for example, postpositional particle or auxiliary verb) in addition to the independent word. The language type of the input sentence can be either the native language for the user or a foreign language. Note that in the following explanation, a case where the native language for the user is set in, for example, the foreign language sentence creation support apparatus 1 in advance will be exemplified. However, the setting of the language type of the native language can arbitrarily be changed.

The language analysis unit 34 has a language analysis execution function of executing language analysis including morphological analysis and syntax analysis for the input sentence whose input has been accepted by the input unit 33. More specifically, the language analysis unit 34 receives the input sentence and the language type of the output sentence from the input unit 33, and determines the language type of the input sentence. Based on the determined language type of the input sentence, the language analysis unit 34 executes language analysis for the input sentence. If the determined language type of the input sentence is the native language, the language analysis unit 34 executes language analysis including morphological analysis and syntax analysis for the input sentence. If the determined language type of the input sentence is a foreign language, the language analysis unit 34 executes language analysis including morphological analysis for the input sentence. The language analysis unit 34 transmits the language analysis result to the grammatical feature extraction unit 35.

Note that when determining the language type, the language analysis unit 34 may analyze a character type used in the input sentence. As an example of the language type determination method based on a character type, a method of determining the language type of a sentence mainly including alphabetic characters as English or a method of determining the language type of a sentence including katakana or hiragana characters as Japanese is usable. A method of determining the language type of a sentence formed using only Chinese characters as Chinese may also be usable. Note that the language type determination method is not limited to those described above, and an arbitrary determination method is applicable. These determination methods may be set in the language analysis unit 34 in advance.

Note that when morphological analysis is executed, the language analysis unit 34 obtains a morphological analysis result. More specifically, the language analysis unit 34 separates an input sentence on a word basis, and adds a part of speech corresponding to each word, thereby obtaining a specific way of combining sentences in the input sentence.

When syntax analysis is executed, the language analysis unit 34 obtains a syntax analysis result. More specifically, the language analysis unit 34 obtains the modification relationship between the clauses of the input sentence. The modification relationship between clauses included in the syntax analysis result includes, for example, information representing which word corresponds to a case such as a subjective case or objective case as the grammatical role of a subject or object and information representing which word is associated with which word as the role of a function word. Note that the syntax analysis result may be expressed as a tree structure (syntactic tree) formed from nodes and arcs. Each node represents a clause of a sentence, which can be expressed as an ellipse in the syntactic tree. For a node, the surface character string of a clause represented by the node and the part of speech of the independent word or stem of the clause are added. Each arc represents the modification relationship between clauses of a sentence, which can be expressed as an arrow that connects nodes. For an arc, the type of a modification relationship between clauses represented by the arc is added.

Note that in the following description, a node on the end point side of an arc can be replaced with a "parent node" or "node of modification destination", and a node on the start point side of an arc can be replaced with a "child node" or "node of modification source".

The grammatical feature extraction unit 35 has a grammatical feature extraction function of extracting the grammatical feature of an input sentence based on the result of language analysis executed by the language analysis unit 34. More specifically, for example, the grammatical feature extraction unit 35 receives the language analysis result from the language analysis unit 34, and reads out the pieces of grammatical feature information 31*a* and 31*b* from the grammatical feature information storage unit 31. While referring to the pieces of readout grammatical feature information 31*a* and 31*b*, the grammatical feature extraction unit 35 extracts the grammatical feature of the input sentence based on the language analysis result. The grammatical feature extraction unit 35 transmits the extracted grammatical feature of the input sentence to the search query generation unit 36.

Note that the extracted grammatical feature of the input sentence includes information such as a language type, a main verb, a sentence pattern, a function word, and a sentence composition. The sentence composition includes a specific way of combining sentences as a morphological analysis result, and the modification relationship between clauses as a syntax analysis result. Note that if the received language analysis result does not include a syntax analysis result, the modification relationship between clauses is not included in the sentence composition.

The search query generation unit 36 has a search query generation function of generating a search query based on the grammatical feature extracted by the grammatical feature extraction unit 35. More specifically, for example, the search query generation unit 36 receives the grammatical feature of an input sentence from the grammatical feature extraction unit 35, and reads out the pieces of grammatical feature information 31*a* and 31*b* from the grammatical feature information storage unit 31. While referring to the pieces of readout grammatical feature information 31*a* and 31*b*, the search query generation unit 36 generates a search query of the input sentence based on the grammatical feature of the input sentence. The search query generation unit 36 may obtain a sentence composition included in the grammatical feature of the input sentence as a search query. The search query generation unit 36 transmits the generated search query to the exemplary sentence search unit 37.

The search query generation unit 36 may create a search query based on the grammatical feature, and extend the created search query, thereby finally creating a search query (the search range of the search query may be extended). Extending the search query may include applying at least one of indeclinable word abstraction, synonym extension, postpositional particle extension, and intransitive/transitive verb extension to the search query.

Indeclinable word abstraction indicates using an abstract concept such as a part of speech (for example, noun or pronoun) or grammatical role (for example, object or target word) for an indeclinable word in the search query, instead of using a specific input word. The search query generation unit 36 can also use a portion that can be put into a noun clause in the search query as one noun clause. This allows the search query generation unit 36 to extend a specific indeclinable word in the search query to a concept abstracted by a superordinate concept.

Synonym extension indicates, for a main verb or function word in the search query, including a synonym having the same or similar meaning in the search query so as to simultaneously search for the synonym. This allows the search query generation unit 36 to extend a specific phrase in the search query to a group of phrases including the synonym.

Postpositional particle extension indicates, for a postpositional particle in the search query, including another postpositional particle in the search query so as to simultaneously search for the other postpositional particle. This allows the search query generation unit 36 to extend a postpositional particle in the search query to a group of postpositional particles including the other postpositional particle.

Intransitive/transitive verb extension indicates, for an intransitive/transitive verb in the search query, including a corresponding transitive verb or intransitive verb in the search query so as to simultaneously search for the corresponding transitive verb or intransitive verb. This allows the search query generation unit 36 to extend an intransitive verb or transitive verb in the search query to a group of verbs including the transitive verb or intransitive verb paired with the verb.

Note that the search query generation unit 36 may select, in correspondence with the language type of the input sentence, which extension item is to be applied. For example, if a Japanese sentence is input as a foreign language sentence, the Japanese input sentence may be a Japanese sentence in which an intransitive verb or transitive verb is incorrectly used, or a postpositional particle is incorrectly used. Hence, for the Japanese input sentence, the search query generation unit 36 can particularly apply intransitive/transitive verb extension and postpositional particle extension as the extension items of the search range of a generated search query. Note that when a Chinese sentence is input, the search query generation unit 36 need not apply intransitive/transitive verb extension and postpositional particle extension.

The exemplary sentence search unit 37 receives the generated search query from the search query generation unit 36, receives the output language type of the output sentence from the input unit 33, and reads out the exemplary sentence corpus 32*a* from the exemplary sentence corpus storage unit 32. The exemplary sentence search unit 37 searches for an index in the exemplary sentence corpus 32*a* based on the search query and the output language type, extracts a set of an exemplary sentence corresponding to an index that matches the search query and an exemplary sentence of the output language type corresponding to the exemplary sentence, and transmits the set to the output unit 38. Note that if the language type of the input sentence is identical to that of the output sentence, the extracted exemplary sentence may be of the monolingual.

In addition to the set of exemplary sentences, the exemplary sentence search unit 37 may further extract an index corresponding to the exemplary sentence set and transmit it to the output unit 38. When determining whether an index matches the search query, the exemplary sentence search unit 37 may calculate the similarity between the index and the search query. As the similarity calculation method, an existing statistical method may be used. In this case, the exemplary sentence search unit 37 may transmit the similarity to the output unit 38 together with the exemplary sentence set.

If no index exists in the exemplary sentence corpus 32*a*, the exemplary sentence search unit 37 may transmit an exemplary sentence in the exemplary sentence corpus 32*a* to the language analysis unit 34, the grammatical feature extraction unit 35, and the search query generation unit 36, and cause them to execute language analysis, extract a grammatical feature, and generate a search query, respectively. The exemplary sentence search unit 37 may receive a search query for each exemplary sentence in the exemplary sentence corpus 32*a* from the search query generation unit 36, and use the search query for each exemplary sentence as an index. To use the index later, the exemplary sentence search unit 37 may store the index in the exemplary sentence corpus storage unit 32 so as to include it in the exemplary sentence corpus 32*a*.

The output unit 38 receives an exemplary sentence or exemplary sentence set corresponding to the index that matches the search query from the exemplary sentence search unit 37, and outputs it to a user as a search result. As the output form of the search result by the output unit 38, for example, a form to display and output the result on a liquid crystal display can be used as needed. Note that the output unit 38 may receive the similarity between the index and the search query from the exemplary sentence search unit 37. When outputting the search result, the output unit 38 may sort the exemplary sentences in accordance with the received similarity of search so as to allow the user to easily confirm the search result, or explicitly indicate a character string that matches the search query using a color or underline so as to allow the user to easily recognize the character string. The exemplary sentence search unit 37 and the output unit 38 form an output unit configured to, in a case where the input sentence is a native language sentence, search for an index based on the generated search query and output an exemplary sentence set including an exemplary sentence of the native language corresponding to the index that matches the search query and an exemplary sentence of the foreign language corresponding to the exemplary sentence of the native language. Also, the exemplary sentence search unit 37 and the output unit 38 form an output unit configured to, in a case where the input sentence is a foreign language sentence, search for an index based on the generated search query and output an exemplary sentence of the foreign language corresponding to the index that matches the search query. The latter output unit may further output an exemplary sentence of the native language corresponding to the exemplary sentence of the foreign language corresponding to the index that matches the search query.

Figure 6:
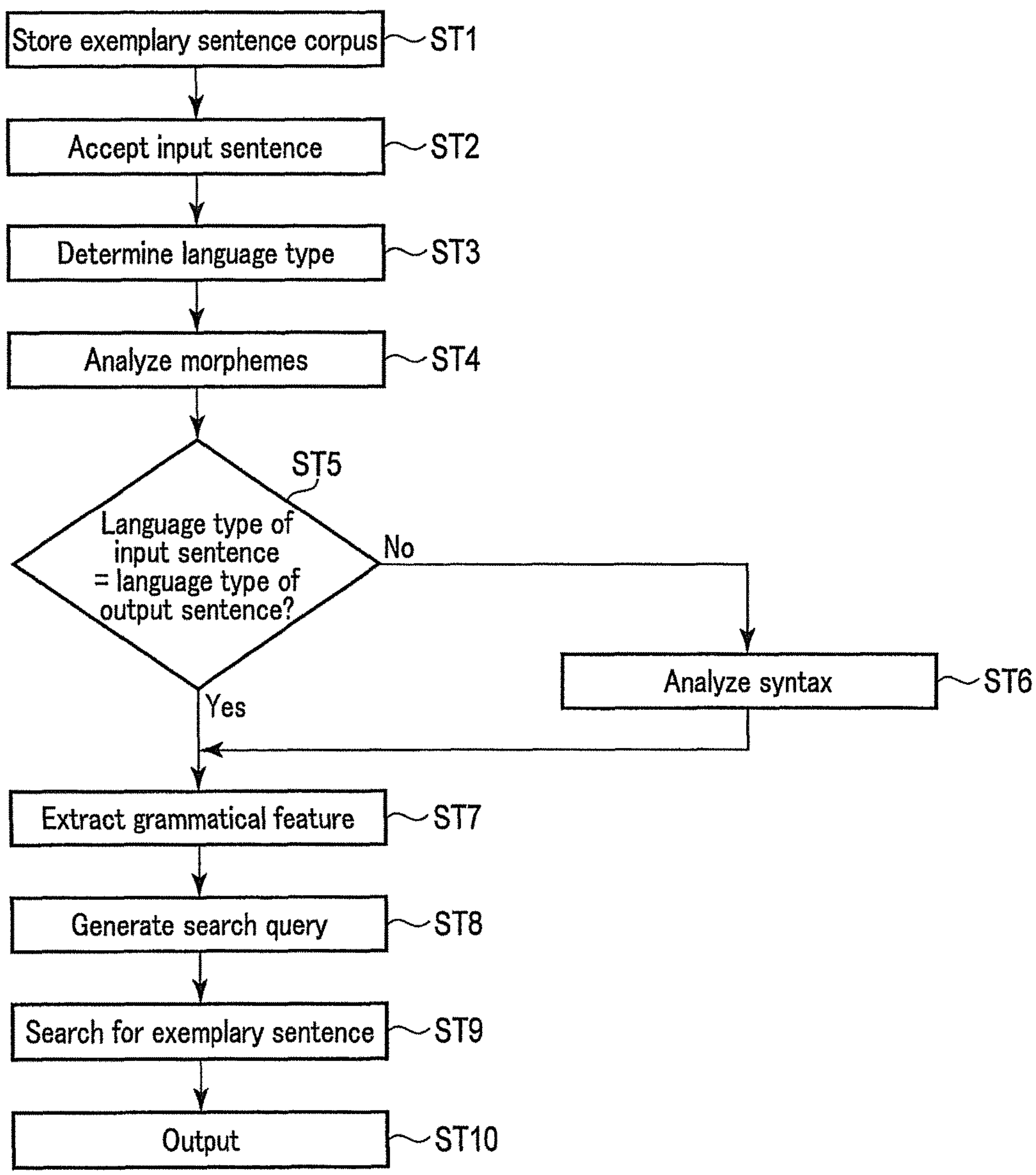
FIG. 6 is a flowchart for explaining an operation according to the embodiment.

The operation of the foreign language sentence creation support apparatus 1 having the above-described arrangement will be described next with reference to the flowchart of FIG. 6. Note that in the following description, assume that Chinese is set in the foreign language sentence creation support apparatus 1 as a native language, and Japanese is output as an output sentence. Note that only Japanese is assumed to be stored as foreign language information for the sake of simplicity. That is, the grammatical feature information storage unit 31 is assumed to store the pieces of grammatical feature information 31*a* and 31*b* in advance.

First, an operation in a case where the native language is input as an input sentence will be described. Here, for example, a case where (input sentence A) "让不懂日语的人读日语教科书。" that is a grammatically perfect native language sentence is input will be described.

First, the exemplary sentence corpus storage unit 32 stores the exemplary sentence corpus 32*a* (step ST1).

Next, the input unit 33 accepts input of the input sentence A and the language type "Japanese" of the output sentence (step ST2), and transmits the input sentence A and the language type "Japanese" of the output sentence to the language analysis unit 34.

The language analysis unit 34 receives the input sentence A and the language type "Japanese" of the output sentence and determines the language type of the input sentence A (step ST3). Based on the fact that, for example, the input sentence A is formed using only Chinese characters, the language analysis unit 34 determines that the input sentence A is a Chinese sentence.

The language analysis unit 34 executes language analysis of the input sentence A (steps ST4 to ST6).

More specifically, the language analysis unit 34 executes morphological analysis for the input sentence A (step ST4), and obtains a morphological analysis result. More specifically, the language analysis unit 34 divides the input sentence A as shown in FIG. 7A on a word basis into "让/不懂/日语的/人 /读/日语教科书/。" and adds a part of speech to each word, as shown in FIG. 7B.

The language analysis unit 34 determines whether the language type of the input sentence A is identical to that of the output sentence (step ST5). The language analysis unit 34 determines that the language type of the input sentence A is not identical to that of the output sentence (NO in step ST5), and executes syntax analysis for the input sentence A based on the obtained morphological analysis result (step ST6).

Figure 8:
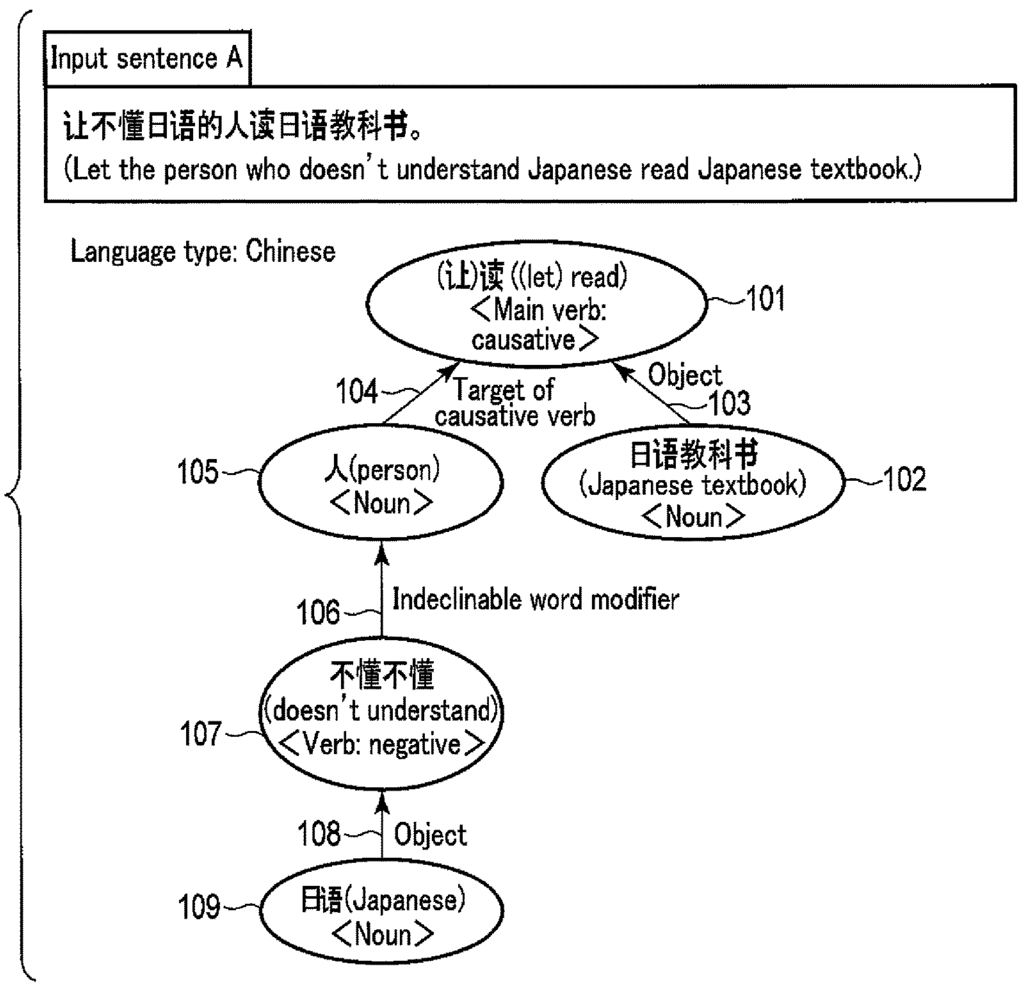
FIG. 8 is a schematic view showing an example of a syntax analysis result according to the embodiment.

More specifically, the language analysis unit 34 obtains, as the structure of the input sentence A, a syntactic tree formed from nodes 101, 102, 105, 107, and 109 and arcs 103, 104, 106, and 108, as shown in FIG. 8. For example, the relationship between the nodes 101 and 102 and the arc 103 will be described.

The node 101 indicates a clause "让)读" (Japanese translation: "読ませる") and represents that the part of speech of "读" is the main verb, and "让" included in the clause "让)读" is a function word indicating a causative form. The node 102 indicates a clause "日语教科书", and represents that the part of speech of "日语教科书" is a noun.

"Object" is added to the arc 103, indicating that the node 101 and the node 102 are associated with each other such that the node 101 serves as a parent node, and the node 102 serves as a child node. That is, the arc 103 represents that the node 102 is the object of the node 101.

The language analysis unit 34 transmits a language analysis result including the obtained morphological analysis result and syntax analysis result to the grammatical feature extraction unit 35.

The grammatical feature extraction unit 35 receives the language analysis result, and reads out the grammatical feature information 31*a* from the grammatical feature information storage unit 31. The grammatical feature extraction unit 35 extracts the grammatical feature of the input sentence A based on the language analysis result and the grammatical feature information 31*a* (step ST7). More specifically, as shown in FIG. 9, the grammatical feature extraction unit 35 extracts, as the grammatical feature of the input sentence A, that the input sentence A is "causative sentence" of the main verb "读" using the function word "让".

The grammatical feature extraction unit 35 also obtains a sentence composition including a specific way of combining sentences as the morphological analysis result of the input sentence A and the modification relationship between the clauses as the syntax analysis result. The grammatical feature extraction unit 35 transmits the extracted grammatical feature of the input sentence A to the search query generation unit 36.

The search query generation unit 36 receives the grammatical feature of the input sentence A, and reads out the grammatical feature information 31*a* from the grammatical feature information storage unit 31. The search query generation unit 36 generates a search query based on the grammatical feature of the input sentence A and the grammatical feature information 31*a* (step ST8). More specifically, the search query generation unit 36 uses the sentence composition in the grammatical feature of the input sentence A as a search query.

In addition, the search query generation unit 36 extends the generated search query based on the grammatical feature information 31*a*, as shown in FIG. 10. More specifically, the search query generation unit 36 applies indeclinable word abstraction and synonym extension as the search range of the generated search query.

That is, the search query generation unit 36 applies indeclinable word abstraction to the search query to put "不懂日语的人" (Japanese translation: 日本語が分からない人) into one noun clause and extend the search range to "target word". In addition, the search query generation unit 36 applies synonym extension to the search query to include "阅读" that is a synonym of the main verb "读", and "叫" "令", and "使" that are synonyms of the function word "让" in the search query, thereby extending the search range.

The search query generation unit 36 transmits the generated search query to the exemplary sentence search unit 37.

The exemplary sentence search unit 37 receives the search query, receives "Japanese" as the output language type of the output sentence from the input unit 33, and reads out the exemplary sentence corpus 32*a* from the exemplary sentence corpus storage unit 32. The exemplary sentence search unit 37 searches for an index in the exemplary sentence corpus 32*a* based on the search query and the output language type, and acquires a set of a Chinese exemplary sentence corresponding to an index that matches the search query and a Japanese exemplary sentence corresponding to the Chinese exemplary sentence (step ST9). More specifically, the exemplary sentence search unit 37 refers to a Chinese index in the exemplary sentence corpus 32*a*, and extracts following Chinese exemplary sentences 1 to 3 that match the search query.

(Chinese exemplary sentence 1): "让你的智能手机读你的喜怒哀乐。"

(Chinese exemplary sentence 2): "叫孩子们读英语。"

(Chinese exemplary sentence 3): "叫孩子们读英语。"

The exemplary sentence search unit 37 further extracts Japanese exemplary sentences 1 to 3 corresponding to extracted Chinese exemplary sentences 1 to 3, acquires the sets of the exemplary sentences, and transmits them to the output unit 38.

The output unit 38 receives the acquired sets of exemplary sentences (step ST10). The output unit 38 outputs output sentences A-1 to A-3 as the sets of exemplary sentences, thereby presenting them to the user, as shown in FIG. 11. Note that concerning the acquired sets of exemplary sentences, the output unit 38 may explicitly indicate character strings conforming to the search query using a color or underline.

Based on the input sentence A of the native language, shown in FIG. 8, whose input has been accepted, the foreign language sentence creation support apparatus 1 can thus output an exemplary sentence similar to the grammatical feature of the input sentence. The user can refer to the output sentence to create a correct foreign language sentence. More specifically, the user can create a Japanese sentence "" by referring to the usage and the like of a verb "" in the output sentences A-1 and A-2. In addition, the user can create a Japanese sentence "" by referring to the usage and the like of a verb "" in the output sentence A-3, as shown in FIG. 11.

Next, an operation in a case where a foreign language is input as an input sentence will be described. Here, as shown in FIG. 12A, for example, a case where (input sentence B) "" that is a grammatically imperfect foreign language sentence is input will be described.

First, the exemplary sentence corpus storage unit 32 stores the exemplary sentence corpus 32*a* (step ST1).

Next, the input unit 33 accepts input of the input sentence B and the language type "Japanese" of the output sentence (step ST2), and transmits the input sentence B and the language type "Japanese" of the output sentence to the language analysis unit 34.

The language analysis unit 34 receives the input sentence B and the language type "Japanese" of the output sentence and determines the language type of the input sentence B (step ST3). Considering that, for example, the input sentence B includes hiragana and katakana characters “は, データ, を, え, た”, the language analysis unit 34 determines that the input sentence B is a Japanese sentence.

The language analysis unit 34 executes language analysis of the input sentence B (steps ST4 and ST5).

More specifically, the language analysis unit 34 executes morphological analysis for the input sentence B (step ST4), and obtains a morphological analysis result. More specifically, the language analysis unit 34 divides the input sentence B as shown in FIG. 12A on a word basis into “管理者/は/デ -タ/を/増えた/。” and adds a part of speech to each word, as shown in FIG. 12B.

The language analysis unit 34 determines whether the language type of the input sentence B is identical to that of the output sentence (step ST5). The language analysis unit 34 determines that the language type of the input sentence B is identical to that of the output sentence (YES in step ST5), and transmits a language analysis result including the obtained morphological analysis result to the grammatical feature extraction unit 35 without executing syntax analysis for the input sentence B based on the obtained morphological analysis result.

The grammatical feature extraction unit 35 receives the language analysis result, and reads out the grammatical feature information 31*b* from the grammatical feature information storage unit 31. The grammatical feature extraction unit 35 extracts the grammatical feature of the input sentence B based on the language analysis result and the grammatical feature information 31*b* (step ST7).

More specifically, as shown in FIG. 13, the grammatical feature extraction unit 35 extracts, as the grammatical feature of the input sentence B, that the input sentence B is a “Japanese” sentence that uses “は” and “を” as function words and “増える” as the main verb in the “past tense”. The grammatical feature extraction unit 35 also extracts a sentence composition that includes a specific way of combining sentences as the morphological analysis result of the input sentence B but not the modification relationship between the clauses as a syntax analysis result. The grammatical feature extraction unit 35 transmits the extracted grammatical feature of the input sentence B to the search query generation unit 36.

The search query generation unit 36 receives the grammatical feature of the input sentence B, and reads out the grammatical feature information 31*b* from the grammatical feature information storage unit 31. The search query generation unit 36 generates a search query based on the grammatical feature of the input sentence B and the grammatical feature information 31*b* (step ST8). More specifically, the search query generation unit 36 uses the sentence composition in the grammatical feature of the input sentence B as a search query.

In addition, the search query generation unit 36 extends the generated search query based on the grammatical feature information 31*b*, as shown in FIG. 14. More specifically, the search query generation unit 36 applies indeclinable word abstraction, postpositional particle extension, and intransitive/transitive verb extension as the search range of the generated search query. That is, the search query generation unit 36 applies indeclinable word abstraction to the search query to extend the search range of “管理者” and “データ” to “noun clause”. In addition, the search query generation unit 36 applies postpositional particle extension to the search query to include a postpositional particle “が” in the search query concerning the postpositional particles “は” and “を”, thereby extending the search range. Furthermore, the search query generation unit 36 applies intransitive/transitive verb extension to the search query to include “増やす” that is a transitive verb paired with an intransitive verb “増える”, thereby extending the search range.

The search query generation unit 36 transmits the generated search query to the exemplary sentence search unit 37.

The exemplary sentence search unit 37 receives the search query, and reads out the exemplary sentence corpus 32*a* from the exemplary sentence corpus storage unit 32. The exemplary sentence search unit 37 searches for an index in the exemplary sentence corpus 32*a* based on the search query, and acquires a set of sentence including a Japanese exemplary sentence corresponding to an index that matches the search query and a Chinese exemplary sentence corresponding to the Japanese exemplary sentence (step ST9). More specifically, the exemplary sentence search unit 37 refers to a Japanese index in the exemplary sentence corpus 32*a*, and extracts following Japanese exemplary sentences 1 to 3 that match the search query.

(Japanese exemplary sentence 1): “会社は社員の給料を増やした。”

(Japanese exemplary sentence 2): “企業が採用数を 増やす理由。”

(Japanese exemplary sentence 3): “最近はお客さ んが増えた。”

The exemplary sentence search unit 37 further extracts Chinese exemplary sentences 1 to 3 corresponding to extracted Japanese exemplary sentences 1 to 3, acquires the sets of the exemplary sentences, and transmits them to the output unit 38. Note that if the language type of the input sentence B is identical to that of the output sentence, the exemplary sentence search unit 37 may acquire only Japanese exemplary sentences 1 to 3 and transmit them to the output unit 38.

The output unit 38 receives the acquired sets of exemplary sentences from the exemplary sentence search unit 37 (step ST10). The output unit 38 outputs output sentences B-1 to B-3 for the user as the sets of exemplary sentences, as shown in FIG. 15. Note that concerning the acquired sets of exemplary sentences, the output unit 38 may explicitly indicate character strings conforming to the search query using a color or underline.

Based on the input sentence B of the foreign language that has been input, the foreign language sentence creation support apparatus 1 can thus output an exemplary sentence similar to the grammatical feature of the input sentence. The user can refer to the output sentence to create a correct foreign language sentence. More specifically, the user can obtain the output sentences B-1 and B-2 by inputting the grammatically imperfect foreign language sentence “管理者はデ ータを増えた。”. In addition, the user can create a Japanese sentence “管理者はデータ を増やした。” by referring to the output sentences B-1 and B-2.

As described above, according to this embodiment, language analysis is executed for an input sentence of a native language, the grammatical feature of the input sentence is extracted based on the language analysis result, and a search query is generated based on the extracted grammatical feature. In addition, an index is searched for based on the generated search query, and a set of an exemplary sentence of the native language corresponding to an index that matches the search query and an exemplary sentence of a foreign language corresponding to the exemplary sentence of the native language is output. It is therefore possible to reduce the load when creating a foreign language sentence.

Giving a supplementary explanation, with the arrangement that outputs a set of an exemplary sentence of a native language and an exemplary sentence of a foreign language based on the grammatical feature of an input sentence of the native language, it is possible to support foreign language sentence creation by a user who has difficulty in creating a foreign language sentence.

For an input sentence of a foreign language, similarly, language analysis of the input sentence is executed, the grammatical feature of the input sentence is extracted based on the language analysis result, and a search query is generated based on the extracted grammatical feature. In addition, an index is searched for based on the generated search query, and an exemplary sentence of the foreign language corresponding to an index that matches the search query is output. Hence, in this case as well, it is possible to reduce the load when creating a foreign language sentence.

Giving a supplementary explanation, with the arrangement that outputs an exemplary sentence of a foreign language based on the grammatical feature of an input sentence of the foreign language, it is possible to present, to a user who can create a grammatically imperfect foreign language sentence, an exemplary sentence of the foreign language whose grammatical feature is similar to that of a foreign language sentence created by himself/herself. Hence, if the grammar of the foreign language sentence input by the user is imperfect, the user can create a grammatically correct foreign language sentence by referring to the presented exemplary sentence of the foreign language. Even if the foreign language sentence input by the user is correct eventually, he/she can confirm that the foreign language sentence created by him/her is grammatically correct by referring to the presented exemplary sentence of the foreign language. It is therefore possible to reduce the load when creating a foreign language sentence.

In addition, with the arrangement capable of further outputting an exemplary sentence of a native language corresponding to an exemplary sentence of a foreign language in a case where a user inputs a foreign language sentence, a parallel translation exemplary sentence of a native language corresponding to the exemplary sentence of the foreign language can be presented to a user who can create a grammatically imperfect foreign language sentence. It is therefore possible to further reduce the load when creating a foreign language sentence.

Moreover, an exemplary sentence whose grammatical feature is similar to that of a foreign language sentence created by a user can efficiently be extracted by extending a created search query based on the grammatical feature and finally generating a search query. More specifically, indeclinable word abstraction, synonym extension, postpositional particle extension, intransitive/transitive verb extension, and the like can be applied. It is therefore possible to reduce the load when creating a foreign language sentence.

Second Embodiment

FIG. 16 is a schematic view showing an example of the hardware arrangement of a foreign language sentence creation support apparatus according to the second embodiment. The same reference numerals as in FIG. 1 denote the same parts in FIG. 16, and a detailed description thereof will be omitted. Different parts will mainly be described.

The second embodiment is a modification of the first embodiment, and the arrangement can output a more appropriate exemplary sentence. More specifically, a foreign language sentence creation support apparatus 1 further includes a semantic attribute information storage unit 39 and a semantic attribute analysis unit 40 in addition to the first embodiment.

The semantic attribute information storage unit 39 is a readable/writable memory and stores, in advance, semantic attribute information 39*a* that associates an entry word with the semantic attribute of the entry word, as shown in FIG. 17. The semantic attribute information 39*a* is an example of information representing the semantic attributes of Japanese entry words. Note that the semantic attribute information storage unit 39 may store not only the semantic attribute information 39*a* of Japanese but also the semantic attribute information 39*a* of entry words of an arbitrary language type. In accordance with readout from the semantic attribute analysis unit 40, the semantic attribute information storage unit 39 transmits the semantic attribute information 39*a* of a designated language type to the semantic attribute analysis unit 40.

A semantic attribute classifies a word based on the meaning of the word. The semantic attribute may be, for example, classification that associates the superordinate concept and the subordinate concept of a word. For example, as the semantic attribute of "リンゴ" that is the superordinate concept of "リンゴ" is usable. As the semantic attribute of "月曜日", "time" that is the superordinate concept of "月曜日" is usable. The semantic attribute may be classified into a plurality of hierarchical levels and set.

For example, the semantic attribute of "管理者" may be classified into three hierarchical levels like "noun:entity:human" and set. The hierarchical level of a semantic attribute may be configured to be limited to a subordinate concept of lower level as the value of the level becomes large. In this case, the semantic attribute of "管理者" is "noun" in hierarchical level 1, "entity" in hierarchical level 2 limited to the subordinate concept of low level, and "human" in hierarchical level 3 limited to the subordinate concept of lower level. In the above example, semantic attributes and classifying method other than "fruit", "time", and "noun:entity:human" can also arbitrarily be employed. As described above, the semantic attribute in the semantic attribute information 39*a* can arbitrarily be set for each entry word.

Note that the subject to define a semantic attribute is mainly assumed to be an indeclinable word such as a noun, pronoun, or the stem of an adjective verb. However, the semantic attribute can be defined not only for an indeclinable word but also for an independent word including a declinable word such as an adjective or verb.

The semantic attribute analysis unit 40 has a semantic attribute analysis execution function of executing semantic attribute analysis of an input sentence based on a result of language analysis executed by a language analysis unit 34. More specifically, the semantic attribute analysis unit 40 receives the language analysis result from the language analysis unit 34, and reads out the semantic attribute information 39*a* from the semantic attribute information storage unit 39. While referring to the semantic attribute information 39*a*, the semantic attribute analysis unit 40 adds a semantic attribute to an independent word used in the input sentence based on the language analysis result, thereby acquiring a semantic attribute analysis result. Note that the semantic attribute analysis unit 40 may classify the semantic attribute to be added into one or a plurality of hierarchical levels. In this case, the result of semantic attribute analysis includes the semantic attribute of the independent word in the input sentence on a hierarchical level basis. The semantic attribute analysis unit 40 transmits the acquired semantic attribute analysis result to a grammatical feature extraction unit 35.

An exemplary sentence corpus storage unit 32 stores an exemplary sentence corpus 32*b* as shown in FIG. 18 in which a semantic attribute is further added to an index.

The language analysis unit 34 transmits the language analysis result to the semantic attribute analysis unit 40.

The grammatical feature extraction unit 35 has an extraction function of extracting the grammatical feature of the input sentence based on the result of semantic attribute analysis executed by the semantic attribute analysis unit 40. More specifically, the grammatical feature extraction unit 35 receives the semantic attribute analysis result from the semantic attribute analysis unit 40, and reads out pieces of grammatical feature information 31*a* and 31*b* from a grammatical feature information storage unit 31. While referring to the pieces of readout grammatical feature information 31*a* and 31*b*, the grammatical feature extraction unit 35 extracts the grammatical feature of the input sentence based on the semantic attribute analysis result. The extracted grammatical feature includes a sentence composition with a semantic attribute added as well as information based on the language analysis result. The added semantic attribute may be classified into a plurality of hierarchical levels. In this case, the grammatical feature extraction unit 35 extracts a grammatical feature including the semantic attribute of each hierarchical level. The grammatical feature extraction unit 35 transmits the extracted grammatical feature of the input sentence to a search query generation unit 36.

The search query generation unit 36 receives the grammatical feature including the sentence composition with the semantic attribute added from the grammatical feature extraction unit 35 in addition to the information based on the language analysis result, and generates a search query based on the grammatical feature. Note that if the semantic attribute is classified into a plurality of hierarchical levels, the search query generation unit 36 may generate a search query by selecting the hierarchical level of a semantic attribute to be applied to the search query. If the semantic attribute is added to an indeclinable word, the search query generation unit 36 may add the semantic attribute instead of applying indeclinable word abstraction to search query generation. Note that the hierarchical level of the semantic attribute to be selected may be set in the search query generation unit 36 in advance, or changed in accordance with a user request as needed. The search query generation unit 36 transmits the generated search query to an exemplary sentence search unit 37.

The exemplary sentence search unit 37 receives the search query from the search query generation unit 36, receives the language type of the output sentence from an input unit 33, and reads out the exemplary sentence corpus 32*b* including an index with an added semantic attribute from the exemplary sentence corpus storage unit 32. The exemplary sentence search unit 37 searches for an index in the exemplary sentence corpus 32*b* based on the search query, extracts an exemplary sentence corresponding to an index that matches the search query, and transmits it to an output unit 38. Note that the exemplary sentence search unit 37 may execute a search for an index classified into the same hierarchical level as that of the semantic attribute selected for the search query or the hierarchical level of a subordinate concept of the semantic attribute. That is, the search range may be limited as the hierarchical level of the selected semantic attribute rises.

Note that if no index exists in the exemplary sentence corpus 32*b*, the exemplary sentence search unit 37 may transmit an exemplary sentence in the exemplary sentence corpus 32*b* to the language analysis unit 34, the semantic attribute analysis unit 40, the grammatical feature extraction unit 35, and the search query generation unit 36, and cause them to execute language analysis, execute semantic attribute analysis, extract a grammatical feature, and generate a search query, respectively. The exemplary sentence search unit 37 may receive a search query for each exemplary sentence in the exemplary sentence corpus 32*b* from the search query generation unit 36, and use the search query for each exemplary sentence as an index. To use the index later, the exemplary sentence search unit 37 may store the index in the exemplary sentence corpus storage unit 32 so as to include it in the exemplary sentence corpus 32*b*.

The operation of the foreign language sentence creation support apparatus 1 having the above-described arrangement will be described next with reference to the flowchart of FIG. 19. Note that in the following description, assume that Chinese is set in the foreign language sentence creation support apparatus 1 as a native language, and Japanese is output as an output sentence, as in the first embodiment. Note that only Japanese is assumed to be stored as foreign language information for the sake of easier understanding. That is, the grammatical feature information storage unit 31 is assumed to store the pieces of grammatical feature information 31*a* and 31*b* in advance.

An operation in a case where a foreign language is input as an input sentence will be described. Here, for example, a case where (input sentence B) "管理者はデー タを増えた。" that is a grammatically imperfect foreign language sentence is input will be described.

Steps ST1 to ST5 are executed as in the first embodiment.

The language analysis unit 34 determines that the language type of the input sentence B is identical to that of the output sentence (YES in step ST5), and transmits a language analysis result including an obtained morphological analysis result to the semantic attribute analysis unit 40 without executing syntax analysis for the input sentence B based on the obtained morphological analysis result.

The semantic attribute analysis unit 40 receives the language analysis result, and reads out the semantic attribute information 39*a* from the semantic attribute information storage unit 39. The semantic attribute analysis unit 40 executes semantic attribute analysis for the input sentence B based on the language analysis result (step ST7'), thereby acquiring a semantic attribute analysis result. More specifically, the semantic attribute analysis unit 40 adds a semantic attribute to an independent word in the input sentence B as shown in FIG. 20A based on the semantic attribute information 39*a*, as shown in FIG. 20B.

The semantic attribute analysis unit 40 transmits the semantic attribute analysis result to the grammatical feature extraction unit 35.

The grammatical feature extraction unit 35 receives the semantic attribute analysis result, and reads out the grammatical feature information 31*b* from the grammatical feature information storage unit 31. The grammatical feature extraction unit 35 extracts the grammatical feature of the input sentence B based on the semantic attribute analysis result and the grammatical feature information 31*b* (step ST7). More specifically, as shown in FIG. 21, the grammatical feature extraction unit 35 obtains, as the sentence composition of the grammatical feature, a sentence composition that includes the semantic attribute analysis result as well as the language analysis result of the input sentence B. The grammatical feature extraction unit 35 transmits the extracted grammatical feature of the input sentence B to the search query generation unit 36.

The search query generation unit 36 receives the grammatical feature of the input sentence B, and reads out the grammatical feature information 31*b* from the grammatical feature information storage unit 31. The search query generation unit 36 generates a search query based on the grammatical feature of the input sentence B and the grammatical feature information 31*b* (step ST8). More specifically, the search query generation unit 36 uses the sentence composition in the grammatical feature of the input sentence B as a search query.

In addition, the search query generation unit 36 extends the generated search query based on the grammatical feature information 31*b*. If the semantic attribute is classified into a plurality of hierarchical levels, the search query generation unit 36 selects the hierarchical level of the semantic attribute to be applied to a search query, thereby generating a search query. More specifically, if the hierarchical level of the semantic attribute is set to "2", as shown in FIG. 22, the search query generation unit 36 applies "noun:entity" as the semantic attribute of "管理者", thereby generating a search query. In addition, if the hierarchical level of the semantic attribute is set to "3", as shown in FIG. 23, search query generation unit 36 applies "noun:entity:human" as the semantic attribute of "管理者", thereby generating a search query. Note that in the following description, the hierarchical level of the semantic attribute is assumed to be set to "2".

The search query generation unit 36 transmits the generated search query to the exemplary sentence search unit 37.

The exemplary sentence search unit 37 receives the search query, and reads out the exemplary sentence corpus 32*b* from the exemplary sentence corpus storage unit 32. The exemplary sentence search unit 37 searches for an index in the exemplary sentence corpus 32*b* based on the search query, and acquires a Japanese exemplary sentence corresponding to an index that matches the search query (step ST9). The exemplary sentence search unit 37 searches for an index of the same hierarchical level as the selected semantic attribute or the hierarchical level of the subordinate concept of the semantic attribute. More specifically, if "2" is selected as the hierarchical level, the exemplary sentence search unit 37 refers to a Japanese index in the exemplary sentence corpus 32*b*, and extracts following Japanese exemplary sentences 1 and 2 that match the search query of the input sentence B.

(Japanese exemplary sentence 1): "会社は社員の 給料を増やした。"

(Japanese exemplary sentence 2): "企業が採用数を 増やす理由"

Note that if "3" is selected as the hierarchical level, the exemplary sentence search unit 37 extracts only Japanese exemplary sentence 1 out of above-described Japanese exemplary sentences.

The exemplary sentence search unit 37 may further extract Chinese exemplary sentences 1 and 2 corresponding to extracted Japanese exemplary sentences 1 and 2, acquire the sets of the exemplary sentences, and transmit them to the output unit 38. Note that if the language type of the input sentence B is identical to that of the output sentence, the exemplary sentence search unit 37 may acquire only Japanese exemplary sentences 1 and 2 and transmit them to the output unit 38.

The output unit 38 receives the acquired sets of exemplary sentences from the exemplary sentence search unit 37 (step ST10). The output unit 38 outputs output sentences B-1 and B-2 for the user as the sets of exemplary sentences, as shown in FIG. 24. Note that concerning the acquired sets of exemplary sentences, the output unit 38 may explicitly indicate character strings conforming to the search query using a color or underline.

Based on the input sentence B of the foreign language that has been input, the foreign language sentence creation support apparatus 1 can thus output an exemplary sentence with a further limited semantic attribute out of exemplary sentences similar to the grammatical feature of the input sentence. The user can thus more efficiently refer to the exemplary sentences to create a correct foreign language sentence. More specifically, the foreign language sentence creation support apparatus 1 can exclude an exemplary sentence "最近はお客さ んが増えた。" to which a semantic attribute "abstract" different from the semantic attribute "entity" of hierarchical level 2 in the input sentence B is added, although the grammatical feature is similar. Hence, the user can create a Japanese sentence "管理者はデ ータを増やした。" by referring to only the output sentences B-1 and B-2.

As described above, according to the second embodiment, it is therefore possible to reduce the load when creating a foreign language sentence. Giving a supplementary explanation, semantic attribute analysis is further executed based on the language analysis result, and a grammatical feature is extracted based on the obtained semantic attribute analysis result. This can exclude an exemplary sentence that is not similar to the input sentence because the semantic attribute is different, although the grammatical feature is similar. It is therefore possible to further reduce the load when creating a foreign language sentence.

As the semantic attribute added by semantic attribute analysis, the semantic attribute of an independent word of the input sentence is classified into a plurality of hierarchical levels, and a hierarchical level of the semantic attribute is selected, thereby generating a search query. Since the search range of an exemplary sentence to be output can be adjusted by changing the hierarchical level of the semantic attribute, an exemplary sentence search within an appropriate search range can be performed. It is therefore possible to further reduce the load when creating a foreign language sentence.

Note that the method described in the above embodiments can be stored in a storage medium such as a magnetic disk (for example, Floppy® disk or hard disk), an optical disk (for example, CD-ROM or DVD), a magnetooptical disk (MO), or a semiconductor memory and distributed as a program executable by a computer.

The storage medium can have any storage form as long as it is a storage medium capable of storing a program and readable by a computer.

An OS (Operating System) that operates on the computer or MW (middleware) such as database management software or network software may execute part of each processing for implementing the embodiments based on an instruction of the program installed from the storage medium to the computer.

The storage medium according to the embodiments is not limited to a medium independent of the computer, and also includes a storage medium in which a program transmitted via a LAN, the Internet, or the like is downloaded and stored or temporarily stored.

The number of storage media in the embodiments is not limited to one. The storage medium according to the present invention also includes a case where the processing according to the embodiments is executed from a plurality of storage media, and any medium configuration can be employed.

Note that the computer according to the embodiments executes each processing according to the embodiments based on the program stored in the storage medium. The computer can be implemented either by a single apparatus formed from a personal computer or the like or by a system in which a plurality of apparatuses are connected via a network.

The computer according to the embodiments is not limited to a personal computer, and also includes a processing unit or microcomputer included in an information processing device. "Computer" is the general term of devices and apparatuses capable of executing the functions of the present invention by a program.

Note that while the embodiments of the present invention have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A foreign language sentence creation apparatus for creation of a first sentence of a foreign language, which is a sentence formed from a plurality of clauses including at least an independent word, comprising:

- a computer memory configured to store an exemplary sentence corpus that includes an exemplary sentence collection including an exemplary sentence set including an exemplary sentence of the foreign language and an exemplary sentence of a native language corresponding to the exemplary sentence of the foreign language, and an index corresponding to the exemplary sentence of the native language; and
- a processor, in communication with the computer memory, that executes the operations of:
  - an input circuit configured to accept input of an input sentence that is a second sentence of the native language corresponding to the first sentence;
  - a language analysis execution circuit configured to execute language analysis including morphological analysis and syntax analysis for the input sentence whose input has been accepted;
  - a grammatical feature extraction circuit configured to extract a grammatical feature of the input sentence based on a result of the executed language analysis, the grammatical feature including information of a main verb, a sentence pattern, a function word, and a sentence composition;
  - a search query generation circuit configured to generate a search query including the extracted grammatical feature; and
  - a search circuit configured to automatically search for the index based on the generated search query, wherein the search is a search of the computer memory; and
  - a display configured to display a plurality of exemplary sentence sets, each of the plurality of exemplary sentence sets including an exemplary sentence of the native language corresponding to an index that matches the search query and an exemplary sentence of the foreign language corresponding to the exemplary sentence of the native language,
- wherein a grammatical feature of each of the plurality of exemplary sentence set is similar to the grammatical feature of the input sentence, and the plurality of exemplary sentence sets include an exemplary sentence set having information different from information of the input sentence; and
- wherein the search query generation circuit is further configured to extend the search query by applying postpositional particle extension to the search query.

2. The apparatus of claim 1, wherein the search query generation circuit is further configured to extend the search query by applying at least one of indeclinable word abstraction, synonym extension, and intransitive/transitive verb extension to the search query.

3. The apparatus of claim 1, wherein the grammatical feature extraction circuit further comprises:

- a semantic attribute analysis circuit which executes semantic attribute analysis of the input sentence based on the result of the executed language analysis; and
- an extraction circuit which extracts the grammatical feature of the input sentence based on a result of the executed semantic attribute analysis.

4. The apparatus of claim 3, wherein the result of the semantic attribute analysis includes a semantic attribute of an independent word in the input sentence on a hierarchical level basis,

- the extraction circuit extracts the grammatical feature including the semantic attribute on the hierarchical level basis, and
- the search query generation circuit generates the search query by selecting the hierarchical level of the semantic attribute to be applied to the search query.

5. A foreign language sentence creation apparatus for creation of a first sentence of a foreign language, which is a sentence formed from a plurality of clauses including at least an independent word, comprising:

- a computer memory configured to store an exemplary sentence corpus that includes an exemplary sentence collection including an exemplary sentence of the foreign language and an index corresponding to the exemplary sentence of the foreign language; and
- a processor, in communication with the computer memory, that executes the operations of:
  - an input circuit configured to accept input of an input sentence that is an evaluation target sentence of the foreign language;
  - a language analysis execution circuit configured to execute language analysis including morphological analysis for the input sentence whose input has been accepted;
  - a grammatical feature extraction circuit configured to extract a grammatical feature of the input sentence based on a result of the executed language analysis, the grammatical feature including information of a main verb, a sentence pattern, a function word, and a sentence composition;
  - a search query generation circuit configured to generate a search query based on the extracted grammatical feature; and
  - a search circuit configured to automatically search a storage medium for the index based on the generated search query; and
  - a display configured to display a plurality of exemplary sentences, each of the plurality of exemplary sentences being an exemplary sentence of the foreign language corresponding to an index that matches the search query, wherein a grammatical feature of each of the plurality of exemplary sentences is similar to the grammatical feature of the input sentence, and the plurality of exemplary sentences include an exemplary sentence set having information meaning different from information of the input sentence; and wherein the search query generation circuit is further configured to extend the search query by applying postpositional particle extension to the search query.

6. The apparatus of claim 5, wherein the memory stores the exemplary sentence corpus including an exemplary sentence collection that further includes an exemplary sentence of a native language corresponding to the exemplary sentence of the foreign language, and the output circuit further outputs the exemplary sentence of the native language corresponding to the exemplary sentence of the foreign language corresponding to the index that matches the search query.

7. The apparatus of claim 5, wherein search query generation circuit is further configured to extend the search query by applying at least one of indeclinable word abstraction, synonym extension, and intransitive/transitive verb extension to the search query.

8. The apparatus of claim 5, wherein the grammatical feature extraction circuit further comprises:

a semantic attribute analysis circuit which executes semantic attribute analysis of the input sentence based on the result of the executed language analysis; and an extraction circuit which extracts the grammatical feature of the input sentence based on a result of the executed semantic attribute analysis.

9. The apparatus of claim 8, wherein the result of the semantic attribute analysis includes a semantic attribute of an independent word in the input sentence on a hierarchical level basis, the extraction circuit extracts the grammatical feature including the semantic attribute on the hierarchical level basis, and the search query generation circuit generates the search query by selecting the hierarchical level of the semantic attribute to be applied to the search query.

10. A foreign language sentence creation method for creation of a first sentence of a foreign language, which is a sentence formed from a plurality of clauses including at least an independent word, comprising:

storing, by a foreign language sentence creation apparatus comprising a processor, an exemplary sentence corpus that includes an exemplary sentence collection including an exemplary sentence set including an exemplary sentence of the foreign language and an exemplary sentence of a native language corresponding to the exemplary sentence of the foreign language, and an index corresponding to the exemplary sentence of the native language;

accepting, by the apparatus, input of an input sentence that is a second sentence of the native language corresponding to the first sentence;

executing, by the apparatus, language analysis including morphological analysis and syntax analysis for the input sentence whose input has been accepted;

extracting, by the apparatus, a grammatical feature of the input sentence based on a result of the executed language analysis, the grammatical feature including information of a main verb, a sentence pattern, a function word, and a sentence composition;

generating, by the apparatus, a search query including the extracted grammatical feature;

automatically searching, by the apparatus, the internet for the index based on the generated search query; and outputting, by the apparatus and on a display, to a user a plurality of exemplary sentence sets, each of the plurality of exemplary sentence sets including an exemplary sentence of the native language corresponding to an index that matches the search query and an exemplary sentence of the foreign language corresponding to the exemplary sentence of the native language, wherein a grammatical feature of each of the plurality of exemplary sentence sets is similar to the grammatical feature of the input sentence, and the plurality of exemplary sentence sets include an exemplary sentence set having information different from information of the input sentence, and wherein the searching for the index comprises extending the search query by applying postpositional particle extension to the search query.

11. A foreign language sentence creation method for creation of a first sentence of a foreign language, which is a sentence formed from a plurality of clauses including at least an independent word, comprising:

storing, by a foreign language sentence creation apparatus comprising a processor, an exemplary sentence corpus that includes an exemplary sentence collection including an exemplary sentence of the foreign language and an index corresponding to the exemplary sentence of the foreign language;

accepting, by the apparatus, input of an input sentence that is an evaluation target sentence of the foreign language;

executing, by the apparatus, language analysis including morphological analysis for the input sentence whose input has been accepted;

extracting, by the apparatus, a grammatical feature of the input sentence based on a result of the executed language analysis, the grammatical feature including information of a main verb, a sentence pattern, a function word, and a sentence composition;

generating, by the apparatus, a search query including the extracted grammatical feature;

searching, by the apparatus, for the index automatically based on the generated search query, wherein the search is a search of a storage medium that accesses the internet; and outputting, by the apparatus and on a display, a plurality of exemplary sentences, each of the plurality of exemplary sentences being an exemplary sentence of the foreign language corresponding to an index that matches the search query, wherein a grammatical feature of each of the plurality of exemplary sentences is similar to the grammatical feature of the input sentence, and the plurality of exemplary sentences include an exemplary sentence having information different from information of the input sentence; and wherein the searching for the index comprises extending the search query by applying postpositional particle extension to the search query.

12. A non transitory computer readable storage medium that stores a program which is executed by a foreign language sentence creation apparatus for creation of a first sentence of a foreign language, which is a sentence formed from a plurality of clauses including at least an independent word, the program comprising:

a first program code, executable by a processor of the apparatus, which causes the foreign language sentence creation support apparatus to store an exemplary sentence corpus that includes an exemplary sentence collection including an exemplary sentence set including an exemplary sentence of the foreign language and an exemplary sentence of a native language corresponding to the exemplary sentence of the foreign language, and an index corresponding to the exemplary sentence of the native language;

a second program code, executable by the processor, which causes the foreign language sentence creation support apparatus to accept input of an input sentence that is a second sentence of the native language corresponding to the first sentence;

a third program code, executable by the processor, which causes the foreign language sentence creation support apparatus to execute language analysis including morphological analysis and syntax analysis for the input sentence whose input has been accepted;

a fourth program code, executable by the processor, which causes the foreign language sentence creation support apparatus to extract a grammatical feature of the input sentence based on a result of the executed language analysis, the grammatical feature including information of a main verb, a sentence pattern, a function word, and a sentence composition;

a fifth program code, executable by the processor, which causes the foreign language sentence creation support apparatus to generate a search query including the extracted grammatical feature;

a sixth program code, executable by the processor, which causes the foreign language sentence creation support apparatus to automatically search a storage unit for the index based on the generated search query; and a seventh program code, executable by the processor, which outputs via a display device a plurality of exemplary sentence sets, each of the plurality of exemplary sentence sets including an exemplary sentence of the native language corresponding to an index that matches the search query and an exemplary sentence of the foreign language corresponding to the exemplary sentence of the native language, wherein a grammatical feature of each of the plurality of exemplary sentence sets is similar to the grammatical feature of the input sentence, and the plurality of exemplary sentence sets include an exemplary sentence set having information different from information of the input sentence; and wherein the fifth program code extends the search query by applying postpositional particle extension to the search query.

13. A non transitory computer readable storage medium that stores a program which is executed by a foreign language sentence creation apparatus for creation of a first sentence of a foreign language, which is a sentence formed from a plurality of clauses including at least an independent word, the program comprising:

a first program code, executable by a processor of the apparatus, which causes the foreign language sentence creation support apparatus to store an exemplary sentence corpus that includes an exemplary sentence collection including an exemplary sentence of the foreign language and an index corresponding to the exemplary sentence of the foreign language;

a second program code, executable by the processor, which causes the foreign language sentence creation support apparatus to accept input of an input sentence that is an evaluation target sentence of the foreign language;

a third program code, executable by the processor, which causes the foreign language sentence creation support apparatus to execute language analysis including morphological analysis for the input sentence whose input has been accepted;

a fourth program code, executable by the processor, which causes the foreign language sentence creation support apparatus to extract a grammatical feature of the input sentence based on a result of the executed language analysis, the grammatical feature including information of a main verb, a sentence pattern, a function word, and a sentence composition;

a fifth program code, executable by the processor, which causes the foreign language sentence creation support apparatus to generate a search query including the extracted grammatical feature;

a sixth program code, executable by the processor, which causes the foreign language sentence creation support apparatus to search automatically for the index based on the generated search query, wherein the search is a search of a storage media that accesses the internet; and a seventh program code, executable by the processor, which outputs on a display device a plurality of exemplary sentences, each of the plurality of exemplary sentences being an exemplary sentence of the foreign language corresponding to an index that matches the search query, wherein a grammatical feature of each of the plurality of exemplary sentences is similar to the grammatical feature of the input sentence, and the plurality of exemplary sentences include an exemplary sentence having information different from information of the input sentence; and wherein the fifth program code extends the search query by applying postpositional particle extension to the search query.

* * * * *